United States Patent [19]
Leahy

[11] Patent Number: 5,778,532
[45] Date of Patent: Jul. 14, 1998

[54] METHOD AND APPARATUS FOR RECONDITIONING CARBURETOR THROTTLE BODIES

[76] Inventor: Mark A. Leahy, 104 Bass Bay, Chippewa Lake, Ohio 44215

[21] Appl. No.: 741,564

[22] Filed: Oct. 31, 1996

[51] Int. Cl.⁶ ............................................. B23P 17/02
[52] U.S. Cl. .......................... 29/888.011; 29/402.06; 29/402.11
[58] Field of Search ..................... 29/888.011, 402.06, 29/402.11

[56] References Cited

U.S. PATENT DOCUMENTS

| | | | |
|---|---|---|---|
| 3,157,068 | 11/1964 | Rickert | 77/2 |
| 3,318,567 | 5/1967 | Gifford | 251/306 |
| 3,674,375 | 7/1972 | Reed et al. | 408/103 |
| 3,828,756 | 8/1974 | Kameraad et al. | 29/402.11 |
| 4,100,663 | 7/1978 | Crum | 29/888.011 |
| 4,420,140 | 12/1983 | Gachot | 29/890.126 |
| 4,997,321 | 3/1991 | Adams | 29/402.06 |
| 5,007,166 | 4/1991 | Erb | 29/888.011 |
| 5,302,057 | 4/1994 | Siegfried | 408/1 |
| 5,363,543 | 11/1994 | Boyd et al. | 29/464 |
| 5,539,580 | 7/1996 | Kammeraad et al. | 29/890.126 |
| 5,666,988 | 9/1997 | Becker | 29/890.124 |

*Primary Examiner*—Erick R. Solis
*Attorney, Agent, or Firm*—Rankin, Hill, Porter & Clark LLP

[57] ABSTRACT

A method and apparatus for reconditioning carburetor throttle bodies includes providing a jig that has first and second locator members with aligned through openings. The jig is attached to the throttle body such that the first locator member is disposed in a throttle bore and the second locator member is disposed adjacent the side of the throttle body. The through openings are aligned with a throttle shaft bore to be reconditioned. Upon inserting a drill bit through the aligned through openings and the throttle shaft bore, the throttle shaft bore will be enlarged. A suitably sized bushing can be driven into the now-enlarged throttle shaft bore.

14 Claims, 3 Drawing Sheets

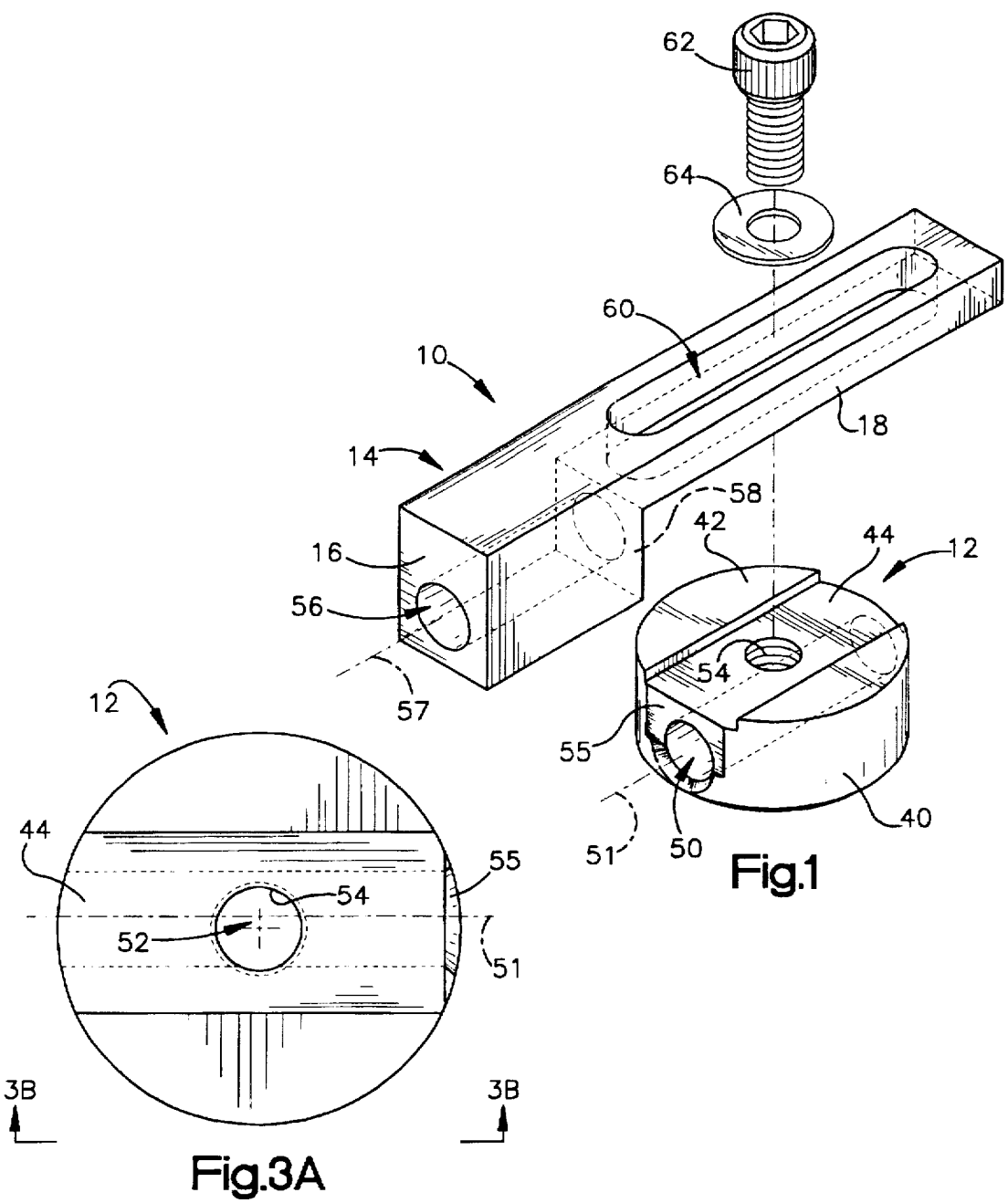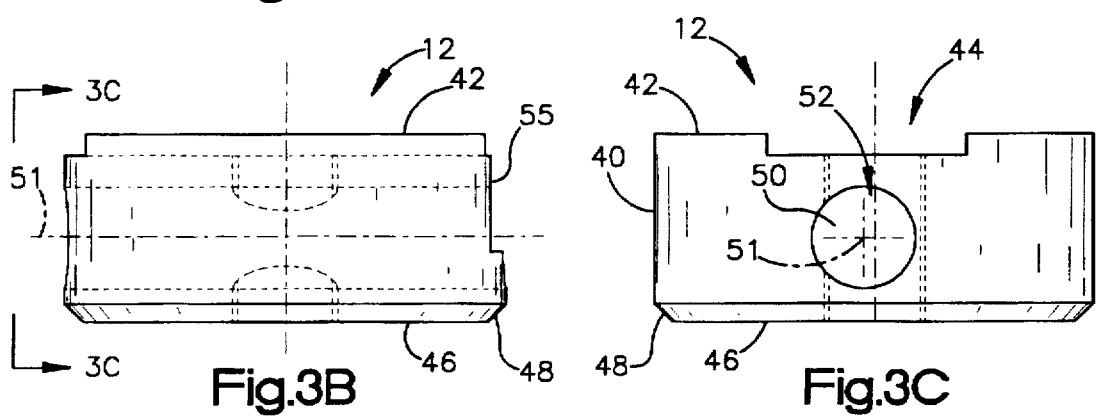

METHOD AND APPARATUS FOR RECONDITIONING CARBURETOR THROTTLE BODIES

BACKGROUND OF THE INVENTION

1. Field of the Invention

The invention relates to techniques for reconditioning carburetor throttle bodies and, more particularly, to a technique for quickly and accurately reboring a throttle shaft bore and installing a bushing therein.

2. Description of the Prior Art

Carburetors typically employ a throttle body in which throttle valves are pivotally supported for opening and closing movement. In a typical four-barrel carburetor, there are two primary throttle bores, usually placed side-by-side, and two secondary throttle bores, also usually placed side-by-side. Both the primary and secondary throttle valves are in the form of thin disks or plates that are mounted on independently movable throttle shafts. Upon rotating the throttle shafts, the throttle valves will be opened or closed so as to adjust the charge density flowing through the carburetor and thereby control the operation of the engine.

As used herein, the term "throttle" will be taken to mean a throttle bore in which a shaft-mounted disk, or plate, is disposed. The primary throttles control the engine for most of its operation. The secondary throttles are employed only when a quick surge of power is needed or when the engine is operating at or near full-power conditions. Consequently, the primary throttles are used the most, with the result that components associated with the primary throttles usually wear out first.

The particular manner in which wear occurs presents significant problems that require the replacement of the entire throttle body. This is a relatively expensive component that greatly increases the cost of a carburetor rebuilding operation. Replacement is necessary because the throttle body typically is made of a relatively inexpensive, weak alloy metal that is suitable for die casting but which is susceptible to wear upon repeated rotation of the throttle shaft. The throttle shaft is disposed in a throttle shaft bore that extends transversely across the throttle body on a line that passes through the throttle bores. It has been found that the throttle shaft bore wears in an oblong cross section adjacent the sides of the throttle body, that is, at the ends of the throttle shaft bore where the throttle shaft enters the housing. The portion of the throttle shaft bore at the center of the throttle body is believed to experience little or no wear during the life of a typical engine. Even if wear occurs at the center of the throttle body, it is not harmful to normal engine operation.

Excessive throttle shaft bore wear is a principal reason that a carburetor must be rebuilt or replaced. Even slight wear at the ends of the throttle shaft bore can result in undesired changes in vacuum levels in the carburetor leading to improper engine operation. While it is possible to rebore the throttle shaft bore and insert bushings of a desired size, such a drilling operation requires extreme skill. In view of the difficulties associated with properly reboring throttle shaft bores, it is conventional practice to simply discard the worn throttle body and replace it with a new one.

SUMMARY OF THE INVENTION

The present invention provides a new and improved technique for reconditioning throttle bodies. In particular, the present invention employs an inexpensive, easily usable jig that can be attached to the throttle body with minimal difficulty and which provides excellent precision in conducting a reboring operation.

Apparatus according to the invention includes a first locator member that is snugly fitted within a selected throttle bore. The first locator member has a first through opening slightly larger that the throttle shaft bore. A second locator member is connected to the first locator member but is disposed adjacent to the throttle body along its side. The second locator member also has a through opening of the same size and shape as the first through opening. The first and second locator members are connected to each other such that the first and second through openings are aligned with each other and with the centerline of the throttle shaft bore.

After the first and second locator members have been securely connected to each other and to the throttle body, an appropriately sized drill bit can be inserted into the second through opening and into the throttle shaft bore so as to enlarge the bore to a desired diameter. After the drilling operation has been completed, the jig is removed and an appropriately sized bushing is driven into the now-enlarged throttle shaft bore. The operation is repeated for the throttle shaft bore on the other side of the throttle body.

In its preferred form, the first locator member is a disk having an outer diameter the same as that of the inner diameter of the throttle opening. The disk has a groove extending along a selected face, which groove is disposed parallel to the first through opening. In the preferred embodiment, the second locator member includes a block from which an elongate arm extends. The arm is adapted to fit snugly within the groove included as part of the disk. The second through opening is included as part of the block. In order to provide easy adjustability of the jig, the arm includes a longitudinally extending slot through which a set screw extends. The set screw is threaded into a threaded opening included as part of the disk. Accordingly, the disk and the block can be moved toward or away from each other, but can be tightly connected to each other once a desired relative position has been obtained. Regardless of the spacing between the disk and the block, the first and second through openings are aligned with each other at all times.

By correctly positioning the first and second through openings relative to the center of the throttle bores, the jig can recondition the throttle shaft bore along the exact centerline specified by the manufacturer. Because the jig according to the present invention is quite inexpensive, mechanics will be able to afford a set of jigs to fit carburetors having any diameter of throttle bore and any position of the throttle shaft bore relative to the centerline of the throttle bores. Due to the simplicity of the jig and its manner of use, mechanics and home repairmen will be able to recondition carburetor throttle bodies quickly and easily with little or no training.

The foregoing and other features and advantages of the invention will be apparent from the specification and claims that follow, taken in conjunction with the accompanying drawings.

BRIEF DESCRIPTION OF THE DRAWINGS

FIG. 1 is a perspective, exploded view of the device according to the invention for reconditioning a carburetor throttle body;

FIG. 3A is a top plan view of a first locator member according to the invention;

FIG. 3B is a cross-sectional view of the locator member according to FIG. 3A taken along a plane indicated by line 3B—3B in FIG. 3A;

FIG. 3C is an end elevational view of the locator member of FIG. 3A;

DESCRIPTION OF THE PREFERRED EMBODIMENT

Figure 2:
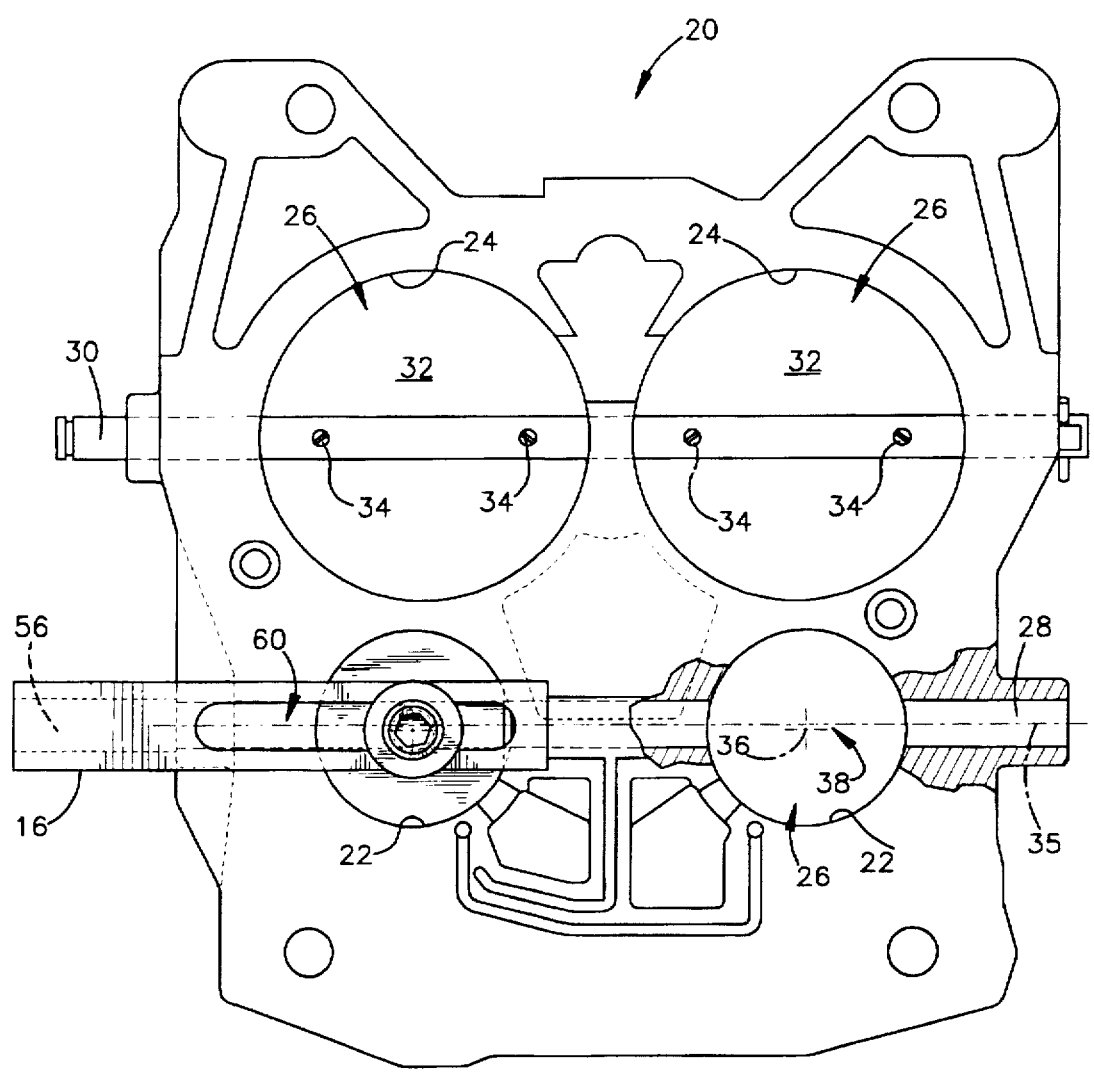
FIG. 2 is a view of a carburetor throttle body with the device of FIG. 1 installed in place prior to conducting a reconditioning operation.

Referring to FIG. 1, a device for reconditioning carburetor throttle bodies is indicated generally by the reference numeral 10. The device 10 essentially is a jig having a first locator member 12 and a second locator member 14. The first locator member 12 generally is in the form of a cylindrical disk. The second locator member 14 includes a block 16 from which an elongate arm 18 extends. The first and second locator members 12, 14 will be described in detail subsequently. The various components of the jig 10 are made from readily available cold rolled steel.

Referring now to FIG. 2, a typical throttle body is indicated by the reference numeral 20. The throttle body 20 is viewed from its underside as would occur during the course of a reconditioning operation. The throttle body 20 is formed in a die casting operation from a metal alloy. The throttle body 20 illustrated in FIG. 2 is manufactured by the Rochester Products Division of General Motors Corporation for use in a so-called Quadrajet carburetor. The specifications given herein are for such a carburetor. However, the present invention is suitable for use with throttle bodies of virtually any manufacturer. Accordingly, the description of the throttle body 20 is to be taken as illustrative of throttle bodies generally.

The throttle body 20 includes a pair of primary throttles 22 that are disposed side-by-side, and a pair of larger secondary throttles 24 that also are disposed side-by-side. Each primary and secondary throttle 22, 24 is defined by a bore 26 that extends through the throttle body 20. A throttle shaft bore 28 extends transversely through the throttle body 20 along a line extending through the bores 26. The bores 26, 28 are disposed at right angles to each other. A throttle shaft 30 extends through the throttle shaft bore 28. The bore 26 for the primary throttles 22 is about 1.375 inch in diameter, the bore 28 is about 0.3135 inch in diameter, and the shaft 30 is about 0.308 inch in diameter. A valve 32 in the form of a thin disk or plate is attached to the throttle shaft 30 by means of screws 34. As will be apparent from the foregoing description, the throttle shaft 30 supports the throttle valves 32 for pivotal movement in the bores 26. As illustrated in FIG. 2, the valves 32 are in the fully closed position. Upon rotating the throttle shaft 30 ninety degrees, the throttle valves 32 will be moved to their fully opened position.

The centerline 35 of the throttle shaft bore 28 is offset from the center 36 of the throttle bore 26. In the example illustrated, the offset for the primary throttles 22 is 0.0245 inch, while the offset for the secondary throttles 24 is greater, about 0.060 inch. The centerline 35 is offset from the center 36 of the bores 26 so that one side of the throttles 22, 24 has a larger area. This feature results in self-closing of the throttles 22, 24. The offset also improves idle-return consistency because sizable closing forces are generated when the manifold vacuum is high, as occurs at idle. Also, the offset provides a safety measure to prevent overspeeding the engine if it is started without the throttle control linkage or throttle return spring, or if these items should fail inadvertently in use. Any reconditioning of the throttle shaft bore 28 must take into account the extent to which the centerline 35 of the throttle shaft bore 28 is offset from the center 36 of the bore 26. The offset between the throttle shaft bore 28 and the bore 26 is shown in FIG. 2 by the reference numeral 38.

Referring now to FIGS. 1 and 3A–3C, the first locator member 12 has a sidewall 40 that is the same diameter as the bore 26 of the primary throttles 22. The disk 12 has a flat upper surface 42 within which a groove 44 is formed. The groove 44 is about 0.625 inch wide and 0.063 inch deep. The disk 12 includes a flat lower surface 46. The interface between the sidewall 40 and the lower surface 46 is defined by a chamfer 48 that facilitates insertion of the disk 12 into the bore 26. With particular reference to FIG. 3C, the disk 12 includes a first through opening 50 that extends through the disk 12. The through opening 50 has a diameter of about 0.375 inch. The centerline 51 of the first through opening 50 is parallel to the center of the groove 44 and is offset from the center of the disk 12 as indicated by the reference numeral 52. The offset 52 is the same as the offset 38. A threaded opening 54 is formed in the disk 12 to be accessible through the groove 44. The sidewall 40 includes a flattened portion 55 that enables the user to easily orient the disk 12 correctly during use.

The block 16 includes a second through opening 56 of the same size and shape as the first through opening 50. The centerline 57 of the second through opening 56 is disposed parallel to the longitudinal axis of the arm 18. As with the first through opening 50, the second through opening 56 is offset from the centerline of the block 14 and the arm 18 about 0.024 inch. That portion of the block 16 closest to the arm 18 through which the second through opening 56 extends defines a locator surface 58 that is adapted to engage the side of the throttle body 20. The locator surface 58 and the centerline 57 of the second through opening 56 are disposed at right angles to each other.

The arm 18 includes a longitudinally extending slot 60. A set screw 62 extends through the slot 60 and into the threaded opening 54. The set screw 62 is short enough that it does not extend into the through opening 50. A washer 64 is provided to evenly distribute the load applied to the arm 14 by the set screw 62.

Figure 4:
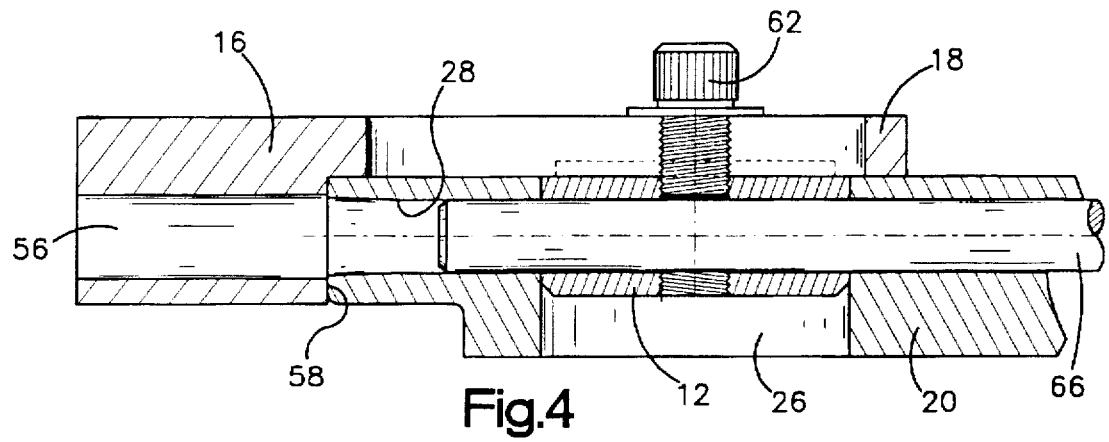
FIG. 4 is a partial cross-sectional view of the throttle body of FIG. 2 taken along a plane indicated by line 4—4 in FIG. 2.

Apparatus according to the invention includes an alignment pin 66 (FIG. 4). The alignment pin 66 is an elongate rod having an outer diameter slightly smaller than the inner diameter of the first and second through openings 50, 56.

The invention also includes a bushing 68 made of bronze or other suitable material. The bushing 68 has an outer diameter that establishes a press fit with the inner diameter of an enlarged bore 28. The inner diameter of the bushing 68 is the same as that of the throttle shaft bore 28 in new condition. In the example given, the bushing 68 is made of so-called Oilube powdered metal bronze, available from Isostatic Industries, Inc., 4153 N. Kostner Avenue, Chicago, Ill., 60641, Part No. 101094. As illustrated, the outer diameter of the bushing 68 is 0.377 inch, the inner diameter is 0.3135 inch, and the bushing 68 is 0.375 inch long.

The bushing 68 is installed by a drive pin 70. The drive pin 70 includes an end portion 72 having a reverse taper of about 0.003 inch that forms a shoulder 74. The shoulder 74 engages the edge of the bushing 68 so as to apply a uniform driving force thereto.

Operation

Figure 5:
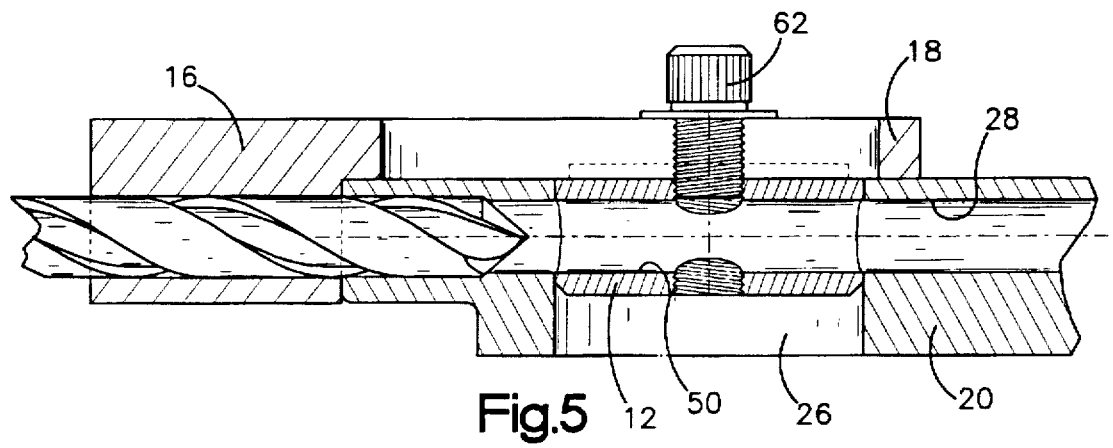
FIG. 5 is a view similar to FIG. 4 showing a drilling operation being performed.
Figure 6:
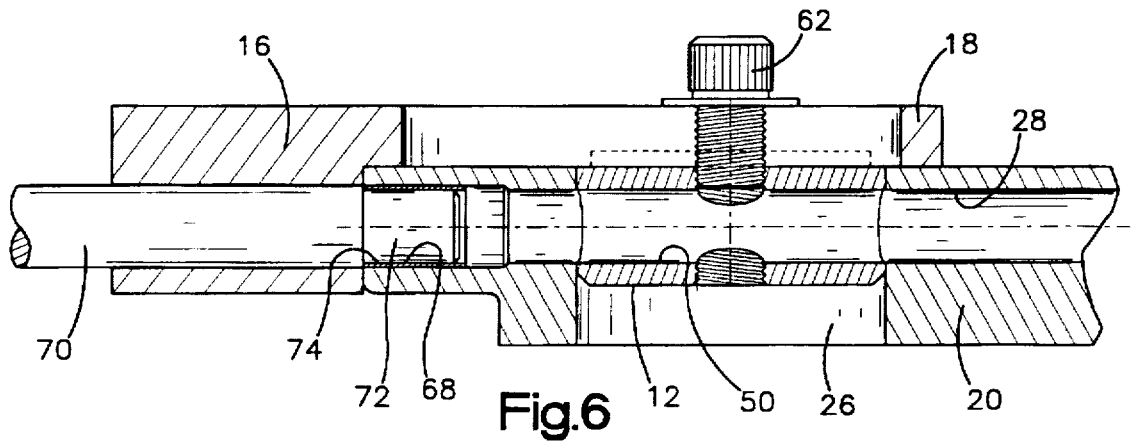
FIG. 6 is a view similar to FIG. 4 showing a bushing being installed into a reconditioned throttle shaft bore.

Referring now to FIGS. 2, 4, 5 and 6, the device 10 is used as follows:

1. The throttle body 20 is turned upside down to expose the underside of the throttle body 20.
2. The disk 12 is inserted into a selected bore 26 such that the centerline 35 of the throttle shaft bore 28 and the centerline 51 of the first through opening 50 are aligned. The flattened portion 55 faces toward the right side of the throttle body 20 when the disk 12 is correctly positioned.
3. The second locator member 14 is positioned as shown in FIGS. 2 and 4 such that the locator surface 58 engages the side of the throttle body 20 and the arm 18 is fitted into the groove 44.
4. The set screw 62 is inserted into the slot 60 and tightened securely into the threaded opening 54.
5. In order to facilitate alignment of the first and second through openings 50, 56 and the throttle shaft bore 28 prior to tightening the set screw 62, the alignment pin 66 is inserted through the aligned openings 28, 50, 56 to insure that the jig 10 is properly positioned (FIG. 4).
6. Upon tightening the set screw 62, the first and second locators 12, 14 will be tightly connected to the throttle body 20 and to each other.
7. A drill bit having an outer diameter the same as that of the first and second through openings 50, 56 is inserted into the second through opening 56 and into the bore 28 (FIG. 5). The bore 28 thus is enlarged to the diameter of the drill bit.
8. After the boring operation has been completed, a bushing 68 is inserted into the now-enlarged bore 28 by means of the drive pin 70 (FIG. 6).
9. After the bushing 68 has been seated as shown in FIG. 6, the set screw 62 is loosened and the jig 10 is installed in the other throttle bore 26. The foregoing steps are repeated such that a bushing 68 is seated in the enlarged throttle shaft bore 28 on the other side of the throttle body 20.

As will be apparent from the foregoing description, the present invention provides an inexpensive, easily used technique for accurately reconditioning throttle bodies. The invention can be used by mechanics or home repairmen with little or no training, and it is sufficiently inexpensive that professional mechanics can acquire a complete set of jigs for use in reconditioning virtually any carburetor throttle body. Because the first locator member 12 fits tightly within the bore 26, critical dimensions such as the offset 38 can be attained without difficulty. In effect, the inner wall of the bore 26 serves as a locator surface to establish the centerline 35, thereby eliminating difficulties associated with locating the centerline 35 in a worn throttle shaft bore 28.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A device for reconditioning a carburetor throttle body wherein a throttle shaft bore having a centerline extends transversely through at least one throttle bore, comprising:
   a first locator member adapted to be fitted within the throttle bore, the first locator member having a first through opening larger than the throttle shaft bore extending transversely therethrough;
   a second locator member connected to the first locator member, the second locator member being disposed adjacent to the throttle body, the second locator member having a second through opening of the same size and shape as the first through opening; and
   the first and second locator members being connected to each other such that the first and second through openings are is aligned with each other and the centerline of the throttle shaft bore.

2. The device of claim 1, further comprising an alignment pin that can be fitted through the first through opening, the second through opening, and the throttle shaft bore, the alignment pin having an outer diameter approximating that of the inner diameter of the throttle shaft bore.

3. The device of claim 1, wherein the first locator member is a disk having an outer diameter approximating that of the inner diameter of the throttle bore.

4. The device of claim 1, wherein the second locator member includes a block from which an elongate arm extends, the arm being connected to the first locator member.

5. The device of claim 1, wherein the first locator member is a disk having an outer diameter approximating that of the inner diameter of the throttle bore, the disk having a groove extending across a selected face, the groove being disposed parallel to the first through bore; and
   the second locator member includes a block from which an elongate arm extends, the arm adapted to fit snugly within the groove included as part of the disk, the second through opening, being included as part of the block.

6. The device of claim of 5, wherein the arm includes a longitudinally extending slot, the disk includes a threaded opening oriented perpendicular to the first though opening and accessible from the groove, and a set screw extends through the slot into the threaded opening in the disk, whereby the disk and the block can be moved toward or away from each other, but can be tightly connected to each other once a desired relative position has been obtained.

7. The device of claim 1, wherein the throttle shaft bore is laterally offset from the centerline of the throttle bore and the first through opening is offset from the centerline of the first locator member the same distance that the throttle shaft bore is offset from the centerline of the throttle bore.

8. The device of claim 1, further comprising:
   a bushing having an outer diameter approximately the same as that of the first through opening and an inner diameter the same as that of the throttle shaft bore; and
   a drift pin for driving the bushing into the throttle shaft bore, the drift pin including an end portion extending into the bushing, the end portion further defining a shoulder for engaging the bushing in driving relationship.

9. The device of claim 8, wherein the shoulder is formed by creating a reverse taper at the end of the drift pin.

10. The device of claim 1, wherein both the throttle bore and the first locator member have a center, the throttle shaft bore is located in a predetermined position relative to the center of the throttle bore, and the first through opening is located in the same predetermined position relative to the center of the first locator member.

11. A device for reconditioning a carburetor throttle body wherein a throttle shaft bore having a centerline extends transversely through at least one throttle bore having a center, the centerline being located in a predetermined position relative to the center, comprising:

a first locator member in the form of a disk having a center adapted to be snugly fitted within the throttle bore, the a disk having a first through opening larger than the throttle shaft bore extending transversely therethrough, the first through opening being located in the same predetermined position relative to the center of the first locator member as the predetermined position of the center of the throttle bore to the centerline of the throttle shaft bore, the disk having a groove extending across a selected face, the groove being disposed parallel to the first through opening;

a second locator member disposed adjacent to the side of the throttle body, the second locator member being in the form of a is block from which an elongate arm extends, the arm adapted to fit snugly within the groove included as part of the disk, the arm includes a longitudinally extending slot, the disk includes a threaded opening oriented perpendicular to the first through opening and accessible from the groove, and a set screw extends through the slot into the threaded opening in the disk, whereby the disk and the block can be moved toward or away from each other, but can be tightly connected to each other once a desired relative position has been obtained; and the second locator member includes a second through opening of the same size and shape as the first through opening, the first and second locator members being connected to each other such that the first and second through openings are aligned with each other.

12. A method for reconditioning a carburetor throttle body wherein a throttle shaft bore having a centerline extends transversely through at least one throttle bore, comprising the steps of:

providing a first locator member having a first through opening larger than the throttle shaft bore extending transversely therethrough;

providing a second locator member having a second through opening of the same size and shape as the first through opening;

disposing the first locator member in the throttle bore;

disposing the second locator member at the side of the throttle body;

connecting the first and second locator members to each other such that the first and second through openings are aligned with each other and the centerline of the throttle shaft bore;

enlarging the throttle shaft bore by extending a drill bit through the second through opening into the throttle shaft bore and into the first through opening, the drill bit having an outer diameter the same as that of the first and second through openings;

removing the first and second locator members from the throttle body; and inserting a bushing in the enlarged throttle shaft bore, the bushing having an outer diameter that establishes a press fit with the enlarged throttle shaft bore, the bushing having an inner diameter the same as that of the original throttle shaft bore.

13. The method of claim 12, wherein the step of aligning the first and second through openings with each other and the centerline of the throttle shaft bore is accomplished by providing an alignment pin and inserting the alignment pin through the first and second openings.

14. The method of claim 12, wherein the step of inserting the bushing is accomplished by providing a drift pin having an end portion that fits within the bushing and which includes a shoulder that engages the end of the bushing, disposing the bushing about the end portion, and driving the bushing into the throttle shaft bore.

* * * * *

UNITED STATES PATENT AND TRADEMARK OFFICE
CERTIFICATE OF CORRECTION

PATENT NO : 5,778,532
DATED : July 14, 1998
INVENTOR(S) : Mark A. Leahy

It is certified that error appears in the above-identified patent and that said Letters Patent are hereby corrected as shown below:

Column 6, Claim 1, Line 17, after "are" delete "is".

Column 7, Claim 11, Line 21, after "a" delete "is".

Signed and Sealed this

Seventeenth Day of November, 1998

*Attest:*

BRUCE LEHMAN

*Attesting Officer*    *Commissioner of Patents and Trademarks*